United States Patent [19]

Hansson

[11] 4,133,085
[45] Jan. 9, 1979

[54] CONNECTING CLAMP
[75] Inventor: Erik G. Hansson, Sandhem, Sweden
[73] Assignee: Svenska Kram AB, Falkoping, Sweden
[21] Appl. No.: 829,065
[22] Filed: Aug. 30, 1977
[30] Foreign Application Priority Data
Aug. 30, 1976 [SE] Sweden .................... 7609581
[51] Int. Cl.² .............................. A44B 21/00
[52] U.S. Cl. ................. 24/263 SW; 24/243 B; 269/234
[58] Field of Search .......... 24/263 SW, 263 A, 243 B; 269/234

[56] References Cited
U.S. PATENT DOCUMENTS
888,931   5/1908   Robinson ................... 24/243 B
895,047   8/1908   Schraudner ................ 24/263 SW
1,496,694 6/1924   Watson ....................... 24/243 B Primary Examiner—Kenneth J. Dorner
Attorney, Agent, or Firm—Cushman, Darby & Cushman

[57] ABSTRACT

A connecting clamp is described which is adapted for easily releasable attachment to a bar or tube having a multi-cornered cross-section. The clamp consists of a yoke having fixed jaws at its ends. One jaw fits closely to one corner of the bar or tube, and the other jaw extends past an opposite corner of the bar or tube and at an obtuse angle, so that a tapering interspace is formed. A wedge for securing the clamp is pressed into said space by a bolt attached to the midpoint of the wedge and extending through the yoke. A recess in the obtuse-angled jaws allows the bolt to swing aside when the wedge has been retracted past the tip of the jaw, thus clearing the tapering space and enabling the removal of the clamp.

11 Claims, 5 Drawing Figures

CONNECTING CLAMP

The invention relates to a connecting clamp adapted for attachment to a solid or hollow bar of non-circular cross-section, particularly a multicornered tube, and above all a tube having a square cross-section. The clamp may serve for holding a tube or for connecting the same to another tube such as in scaffolding.

The object of the invention is to create a clamp which provides a secure grip about the bar or tube without fully encircling the same and which can be easily applied thereto from the side. Another object is to create a clamp which is easy on the tube so that deformation thereof is avoided.

Figure 1:
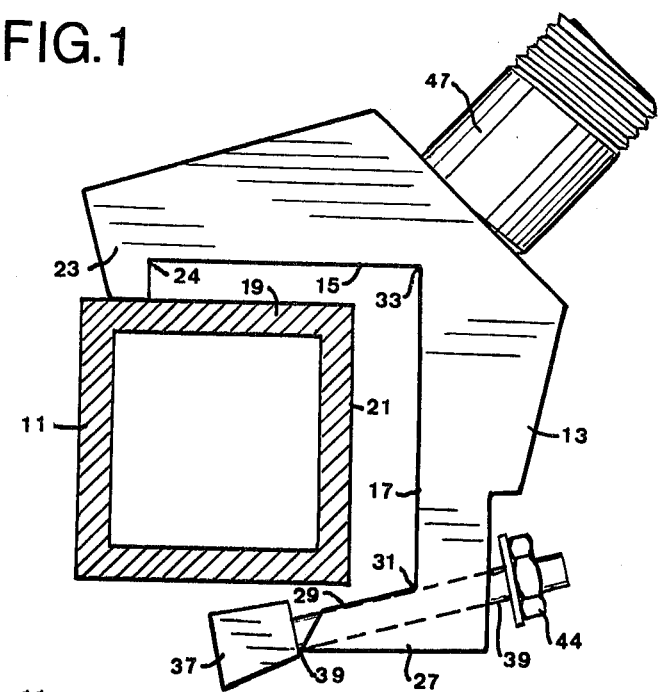
Figure 3:
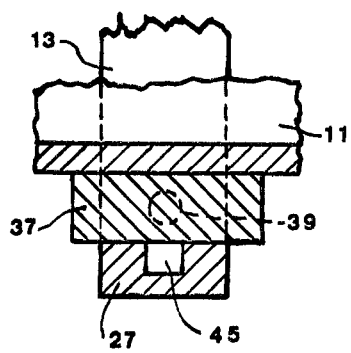
Figure 2:
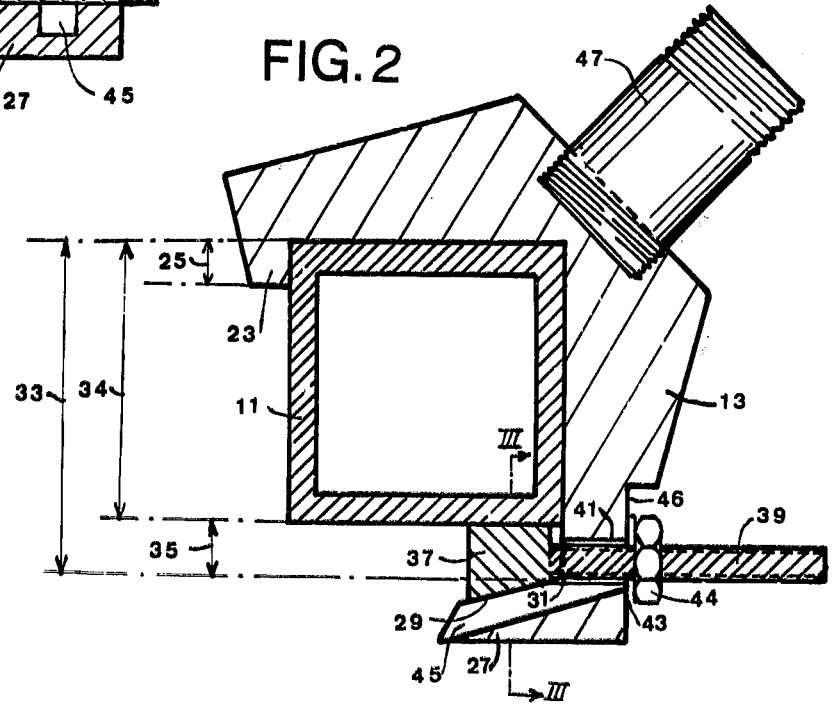
Figure 4:
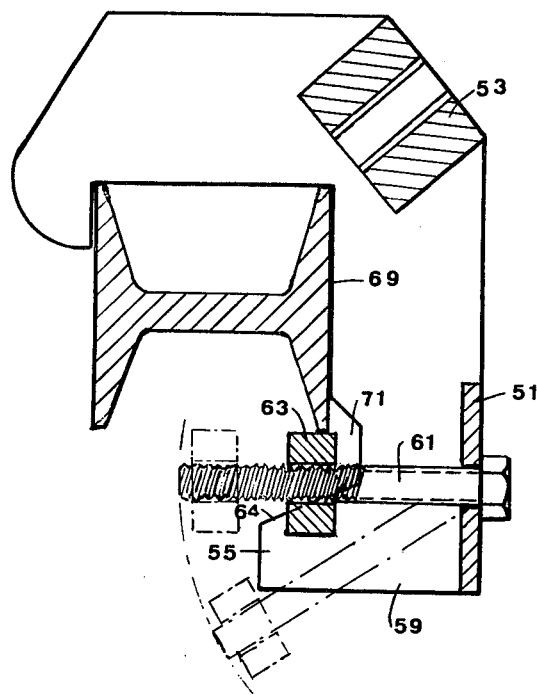
Figure 5:
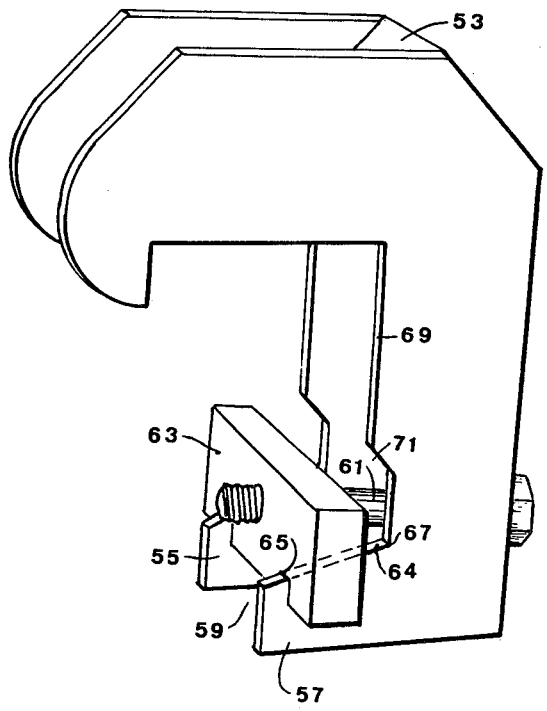

The above objects are fulfilled by designing the clamp as set forth in the concluding claims and as explained in detail hereinbelow with reference to the accompanying drawings. FIGS. 1 to 3 refer to a first embodiment of the clamp according to the invention, FIG. 1 being a side view of the clamp in a stage of its application onto a tube, FIG. 2 showing a midsection of the clamp when applied, and FIG. 3 showing a cross-section taken along the line III — III in FIG. 2. FIG. 4 is a sectional view of a second embodiment of the clamp fastened to an I-beam, and FIG. 5 is a perspective view of said clamp separately.

The clamp (or clasp) shown in FIGS. 1 to 3 which is adapted for attachment to a tube 11 of a square cross-section comprises a yoke (or bow) of a shape suitable for embracing three of the corners of the tube but leaving the fourth free. In the gap facing the tube the yoke has two planar faces 15, 17, at right angles to each other, one being of a length equal to the width of the tube side 19 and the other having a length greater than the width of the tube side 21. One end of the yoke terminates in a fixed jaw (claw or hook) 23, the planar inner face of which forms a right-angled corner 24 with the face 15. As shown in FIG. 2, said jaw can be closely applied against the corner of the tube and contact therewith is had over a marginal zone corresponding to the measure 25 by which the jaw projects from the face 15 and which preferably corresponds to 1.5 to 2 times the thickness of the tube wall. At the other end the yoke terminates in another fixed jaw 27, the planar inner face 29 of which joins the face 17 at a corner 31, forming an obtuse angle, preferably an angle of 110 to 120 degrees. The corner 31 is situated at a distance 32 from the face 15 equal to the sum of the width 34 of the tube side and the measure 35. Said measure 35 should be at least equal to the measure 25, else the clamp cannot be applied from the side of the tube. Thus the inner face 17 is longer than the face 15, i.e. the obtuse-angled jaw 27 lies more distant from the corner 33 between said faces than the right-angled jaw 23. The jaw 27 is longer than the jaw 23 but its length is less than half the length of the face 15.

The inner side 29 of the jaw 27 forms a slip plane for a wedge 37 in the shape of a prismatic member extending in the length direction of the tube and being of a trapezoidal cross-section. Attached to the midpoint of one side of the wedge 37, is a bolt 39 which extends through a bore 41 in the yoke adjacent to the corner 31 and upon the outer threaded end of which there are a washer 43 and a nut 44. The bore 41, the bolt 39 and the side of wedge 37 facing the tube are substantially perpendicular to the yoke face 17. When the nut 44 is being tightened against the flat outer face 46 of the yoke, the slanting lower face of the wedge slides along the slanting upper face 29 of the jaw 27, so that the wedge is applied with a gradually increasing pressure against the tube. In the final position the pressure is applied upon the tube at a marginal zone close to the corner thereof, and in the direction of the tube side 21. The tube also being closely grasped by the clamp at three corners and two intermediate flat faces, great retention forces can be used without any risk of deforming the tube.

The jaw face 29 is divided into two halves by a recess in the shape of a groove 45 which extends in the centre plane of the clamp from the tip of the jaw 27 to the bore 41. After the nut having been unscrewed and the wedge displaced beyond the jaw tip, the bolt can be swung about the outer end of the bore 41 as a fulcrum and take a position in said groove, thereby uncovering the corner 31 as shown in FIG. 1. Then the clamp can be removed by pushing the same first upwardly from the position of FIG. 2 until the corner 31 hits the corner of the tube and then to the right, as shown in FIG. 1. A further condition is that the wedge can also be swung away so far that its distance from the yoke face 15 is at least equal to the measure 32. By the provision of the groove 29 this is made possible as soon as the wedge is retracted beyond the tip of the jaw 27. Thus the wedge need not be removed, the bolt 39 can be short and the extent of required turning of the nut is restricted. The wedge, bolt and nut are always appended to the clamp which simplifies the handling thereof. A further advantage gained by the invention consists in that the fourth corner of the tube is not encumbered, but the same can be permanently connected along its length, for instance to a work bench.

The groove 45 may be so deep that the tip of the jaw 27 is divided and forms a two-pronged fork.

The threaded bolt 47 serves to connect the clamp to some other member, e.g. a building structure or implements to be supported by the tube. Instead of the diagonal position shown, the bolt may be placed at right angles to any of the tube sides, and the bolt may be replaced by other suitable connecting means. Two similar clamps may be connected side to side, each holding one of two tubes crossing each other.

The wedge may be provided with a knob (not shown) which projects into the groove 45 and guides the wedge before it comes into contact with the tube.

In the embodiment shown in FIGS. 4 and 5, the yoke with its jaws, instead of being a solid thick plate as in FIGS. 1 to 3, consists of two equal thin sheet metal plates which are held parallel and spaced by a transverse plate 51 and a cube-shaped body 53 inserted between them. The cube 53 has a threaded bore for connection to other details.

The obtuse-angled jaw is divided into two parts 55, 57, which may be regarded as the prongs of a two-pronged fork. Between them there is a free space 59 that extends from the jaw tips to the plate 51 and is open towards and away from the gap of the clamp. The bolt 61 extends through a hole in the plate 51 and is connected by screw threads to the centre of the wedge 63. The wedge is parallel-epipedic and rests with its ends upon the inner narrow faces 64 of the slanting jaw halves 55, 57. In the bottom side of the wedge there are cut out two slits 65 which embrace and ride each upon a separate one of the jaw halves, thereby guiding the wedge. The bottom of said slits is inclined in correspondence to the inclination of the faces 64, whereas the inwardly facing side of the wedge is parallel to the bolt 61.

After retracting the wedge by unscrewing the bolt 61, the wedge and bolt can be swung about the hole in the plate 51, as indicated by dot-dash-lines in FIG. 4. The bolt will then be accomodated in the interspace 59, which corresponds to the groove 45 of FIGS. 1 to 3.

In this embodiment the obtuse-angled corner 67 is somewhat offset relatively the adjacent yoke face 69 and there is a recess 71 enabling the wedge to be partly drawn past the imaginary extension of said face 69, as shown in FIG. 4. This is advantageous with regard to permissible measure tolerances and in order to have the clamping pressure applied up to the extreme edge of the corner of the profiled bar, which in FIG. 4 is shown as a beam but also may be a square tube.

The embodiments shown and described are merely examples not restricting the scope of the invention. It is obvious that the clamp may be adapted to various bar profiles, solid or hollow, with a different number of corners and/or with mutually different side lengths, such as tubes having a rectangular, hexagonal or octogonal cross-section, either regular or flattened. According to the principal feature of the invention, in these modifications one jaw should fit closely to both faces forming a corner of the bar whereas the other jaw should project at a greater angle and at a distance from the corresponding corner of the bar, forming a tapering space therebetween for insertion of the wedge. When the clamp should be applied to solid bars which are more resistant to deformation, the cross-section of the wedge is not critical but the same may be circular or semicircular and make a line contact with the bar and-/or with the jaw.

What I claim is:

1. A clamp adapted for attachment to a longish body having four parallel right-angled outer corners, comprising a yoke having a gap for partly embracing said body, two planar inner faces at right angles to each forming part of said gap and meeting at a first inner corner, a first jaw integral with said yoke extending from one of said planar inner faces at a right angle to form a second inner corner adapted for close engagement with one outer corner of said body, a second jaw integral with said yoke extending at an obtuse angle from the other of said planar inner faces to form a third inner corner, the distance of said third inner corner from said first inner corner being greater than the distance of said second inner corner from said first inner corner, a member slidingly displaceable along said second jaw for engagement with an outer corner of said body situated diagonally to said first inner corner, and a bolt connected to said member and extending through said yoke for wedging said member into the space between said second jaw and a corresponding outer corner of said body for securing the clamp thereto.

2. A clamp as claimed in claim 1, in which said second jaw is formed with a recess along its inwardly facing side for accommodating said bolt when swung aside to clear the gap in connection with removal of the clamp.

3. A clamp as claimed in claim 1, in which said second jaw is in the shape of a two-pronged fork, the prongs of which form sliding faces for supporting said member and the interspace between said prongs allowing said bolt to swing aside to clear said gap in connection with removal of the clamp.

4. A clamp as claimed in claim 1, in which the difference between the distances of said third and second inner corners to said first inner corner is at least equal to the measure by which said first jaw projects from its adjacent planar inner face of the yoke.

5. A clamp as claimed in claim 1, in which said member is a prismatic body having flat opposite faces forming an acute angle to each other.

6. A clamp adapted for attachment to a bar having a multicornered cross-section, such as a non-circular tube or a beam, comprising a yoke having a gap for partly enclosing the circumference of the bar and ending in first and second jaws reaching past opposite corners of the bar, the yoke being shaped with inner flat faces merging at inner angular corners, said first jaw extending from the adjacent inner flat face of the yoke at an obtuse angle, said second jaw forming a smaller angle to the adjacent flat inner yoke face than said first jaw, a wedge slidingly displaceable along said first jaw, and a bolt attached to said wedge and extending through the yoke for taking support from the outside thereof, said bolt serving to press the wedge against the bar for securing the clamp thereto, the yoke and said first jaw having a recess allowing the bolt to be swung aside together with the wedge in order to clear said gap sufficiently for removal of the clamp from the bar.

7. A clamp as claimed in claim 6, adapted for a bar having a square cross-section, characterised in that the inside of said yoke has three corners, a central corner, near corner, and distant corner; said central corner and said near corner being right-angled, whereas said distant corner forms an obtuse angle of 110° to 120°.

8. A clamp as claimed in claim 6, characterised in that said distant corner is situated at a distance from said central corner which is at least so much greater than the distance of said central corner from said near corner as the jaw adjacent said near corner projects therefrom.

9. A clamp as claimed in claim 6, characterised in that said first jaw is at least partially split lengthwise so as to form a fork having two similar prongs, the inner inclined faces of which form support for the wedge and the space between the prongs constituting the recess for accomodating the bolt when swung aside.

10. A clamp as claimed in claim 6, characterised in that the wedge consists of an essentially prismatic member extending at right angles to the bolt, opposite end portions of said member having flat faces slidingly engaging flat faces upon the said first jaw.

11. A clamp as claimed in claim 10, characterised in that the essentially prismatic member is guided upon the said first jaw in the length direction of the bolt by parts thereof extending into the recess between parallel parts of said jaw.

* * * * *